US007782839B2

(12) United States Patent
Otsuka et al.

(10) Patent No.: US 7,782,839 B2
(45) Date of Patent: Aug. 24, 2010

(54) COMMUNICATION TERMINAL, CONTROL METHOD OF THE SAME, AND CONTROL PROGRAM OF THE SAME

(75) Inventors: Koichiro Otsuka, Tokyo (JP); Tomoyuki Takeda, Tokyo (JP); Muneki Nakao, Tokyo (JP); Yosuke Ezumi, Tokyo (JP); Yoshiyuki Hirai, Tokyo (JP); Shinya Kogure, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1266 days.

(21) Appl. No.: 10/842,761

(22) Filed: May 10, 2004

(65) Prior Publication Data

US 2004/0233898 A1 Nov. 25, 2004

(30) Foreign Application Priority Data

May 20, 2003 (JP) ............................ 2003/141237

(51) Int. Cl.
*H04L 12/66* (2006.01)
(52) U.S. Cl. .................. 370/352; 370/363; 370/365; 370/374; 370/377; 709/208; 709/202; 709/203; 709/229; 709/225; 379/265.09
(58) Field of Classification Search ................ 709/203, 709/204, 206, 227, 229; 379/209.1, 210.01, 379/265.09, 90.01, 93.14; 370/352
See application file for complete search history.

(56) References Cited

U.S. PATENT DOCUMENTS 6,438,599 B1 * 8/2002 Chack ..................... 709/229

| 6,625,643 | B1 * | 9/2003 | Colby et al. ............... 709/217 |
| 6,700,959 | B2 * | 3/2004 | Kotsuki ................. 379/100.01 |
| 6,829,654 | B1 * | 12/2004 | Jungck ..................... 709/246 |
| 6,871,212 | B2 * | 3/2005 | Khouri et al. .............. 709/204 |
| 6,973,482 | B2 * | 12/2005 | Mohammed et al. ........ 709/208 |
| 7,167,899 | B2 * | 1/2007 | Lee et al. ................... 709/204 |

(Continued)

FOREIGN PATENT DOCUMENTS

JP     2003-018314 A     1/2003

OTHER PUBLICATIONS

Kaiser, Remote assistance, Jul. 2001, Microsoft Coporation, all pages.*

*Primary Examiner*—Curtis Kuntz
*Assistant Examiner*—Phung-Hoang J Nguyen
(74) *Attorney, Agent, or Firm*—Canon U.S.A., Inc., IP Division

(57) ABSTRACT

A communication terminal includes a resource transfer button for transferring URL information of an Internet resource to another party with which IP phone conversation has been established so as to allow the browser of the communication terminal of the other party to browse the Internet resource. The URL information of an Internet resource is registered to a one-touch key. Registering the selection information of the communication terminal of the other party and the URL information of an Internet resource enables the URL information thereof to be transferred to the communication terminal of the other party with which the phone conversation has been established immediately following calling the other party by pressing the one-touch key, so as to allow the browser of the communication terminal of the other party to browse the Internet resource. Thus, both the calling and receiving parties can browse the same Internet resource with the respective terminals.

3 Claims, 17 Drawing Sheets

U.S. PATENT DOCUMENTS

| | | | |
|---|---|---|---|
| 7,324,223 B1 * | 1/2008 | Mori | 358/1.15 |
| 2002/0138624 A1 * | 9/2002 | Esenther | 709/227 |
| 2003/0009462 A1 * | 1/2003 | Burnham | 707/10 |
| 2003/0046392 A1 * | 3/2003 | Wen et al. | 709/225 |
| 2003/0065738 A1 * | 4/2003 | Yang et al. | 709/215 |
| 2003/0072423 A1 * | 4/2003 | Momonami | 379/93.02 |
| 2004/0093375 A1 * | 5/2004 | Mason et al. | 709/203 |
| 2004/0163037 A1 * | 8/2004 | Friedman et al. | 715/501.1 |
| 2005/0074101 A1 * | 4/2005 | Moore et al. | 379/114.01 |
| 2005/0111653 A1 * | 5/2005 | Joyce et al. | 379/265.09 |

* cited by examiner

FIG. 6

| COMMUNICATION TERMINAL A (200) | SIP SERVER (110) | LOCATION SERVER (111) | DNS SERVER (112) | WEB SERVER (113) | COMMUNICATION TERMINAL B (220) |
|---|---|---|---|---|---|
| S522 WEB PAGE REQUEST → | | | | | |
| ← S523 WEB PAGE DATA | | | | | |
| DISPLAYING WEB PAGE (S524) | | | | | |
| DEPRESSING RESOURCE TRANSFER BUTTON (S524a) | | | | | |
| GENERATING URL TRANSFER FILE (S525) | | | | | |
| | | S526 SYN → | | | |
| | | ← S527 SYN·ACK | | | |
| | | S528 ACK → | | | |
| | | ← S529 ready | | | |
| | | S530 LOGIN REQUEST FROM A TO B → | | | |
| | | ← S531 LOGIN ACK FROM B TO A | | | |
| SPECIFYING URL TRANSFER PORT (S532) | | | | | |
| | | S533 SYN REQUEST FOR DATA TRANSFER PORT → | | | |
| | | ← S534 SYN→ACK FOR DATA TRANSFER PORT | | | |

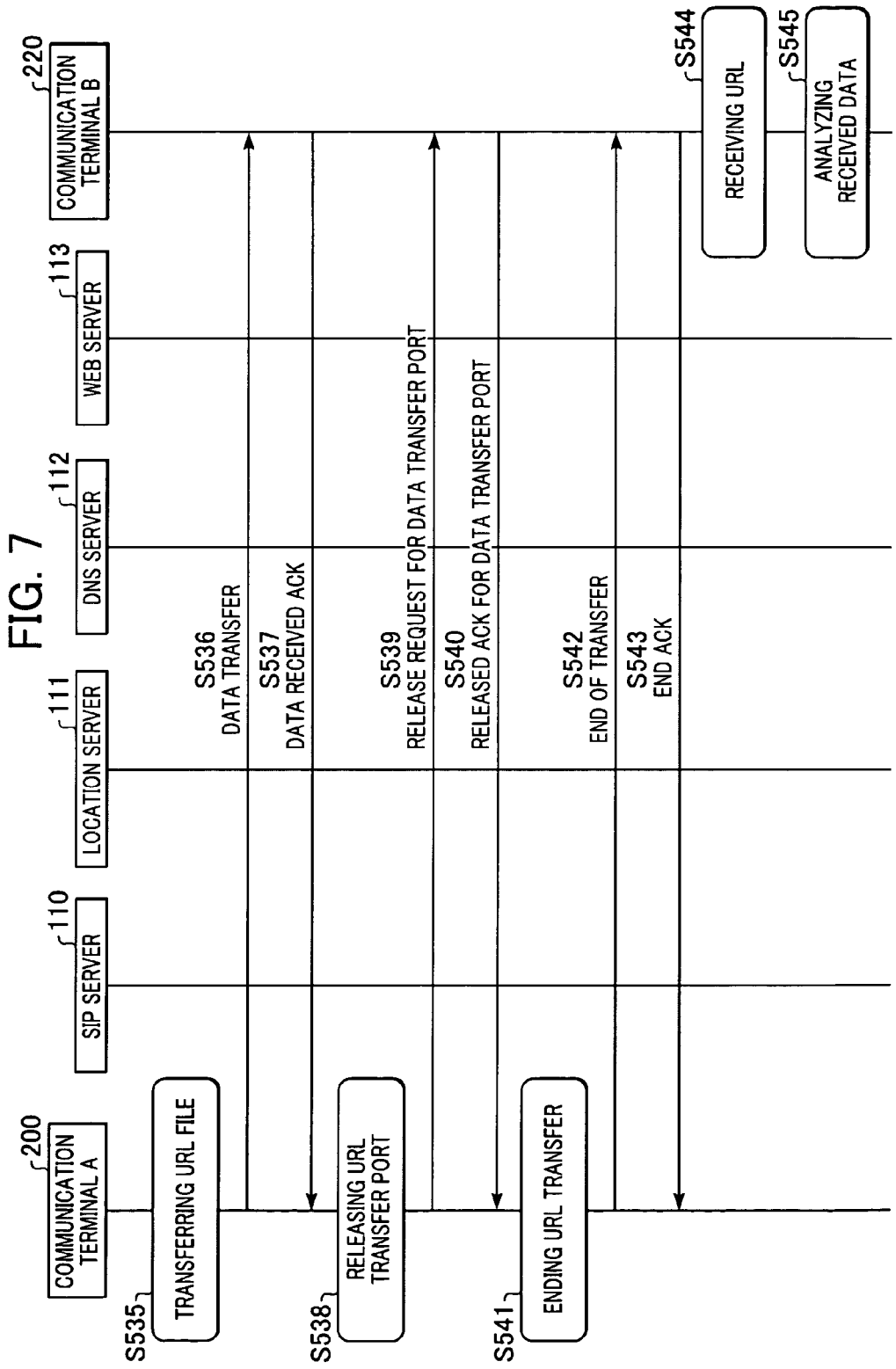

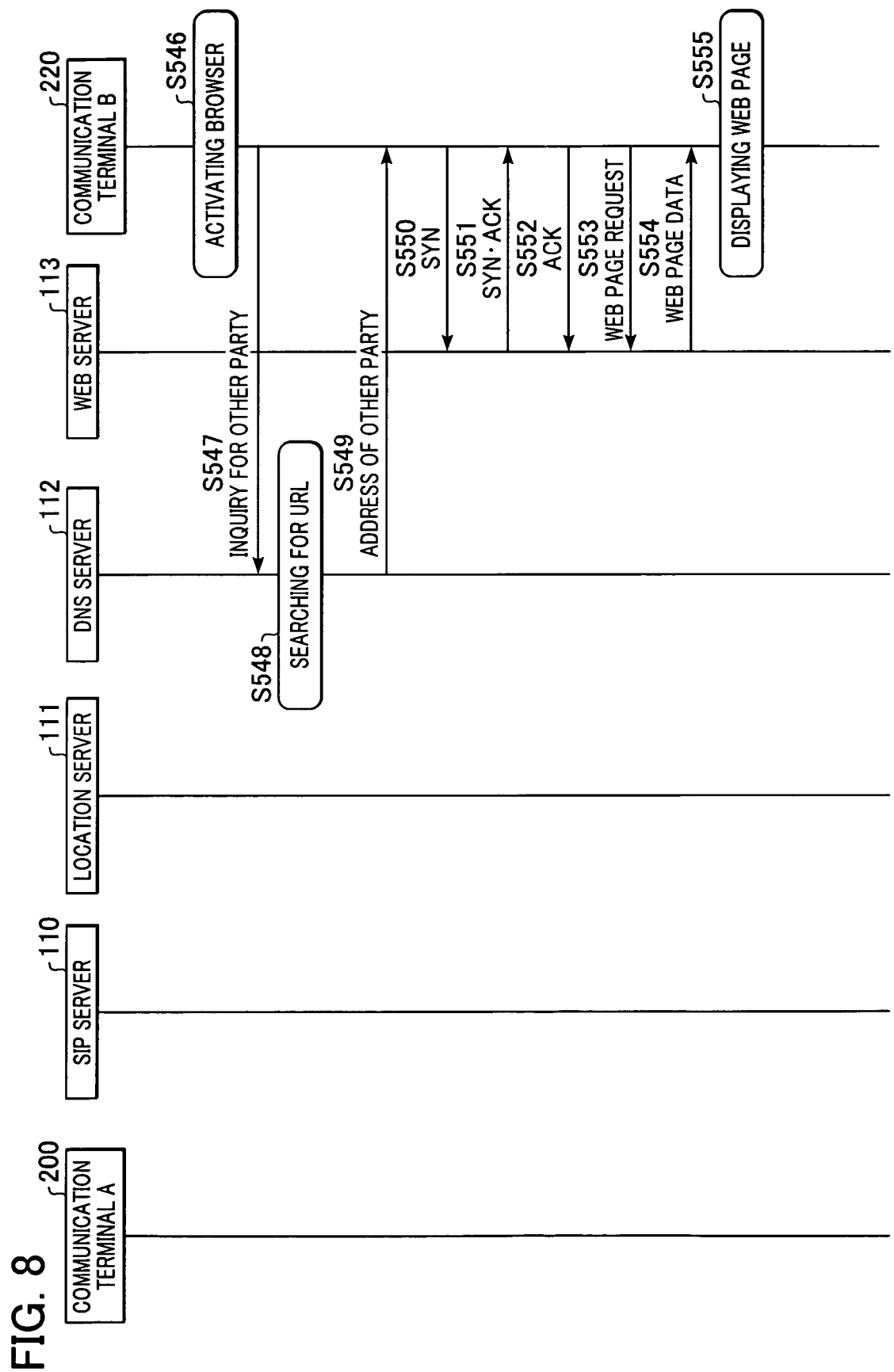

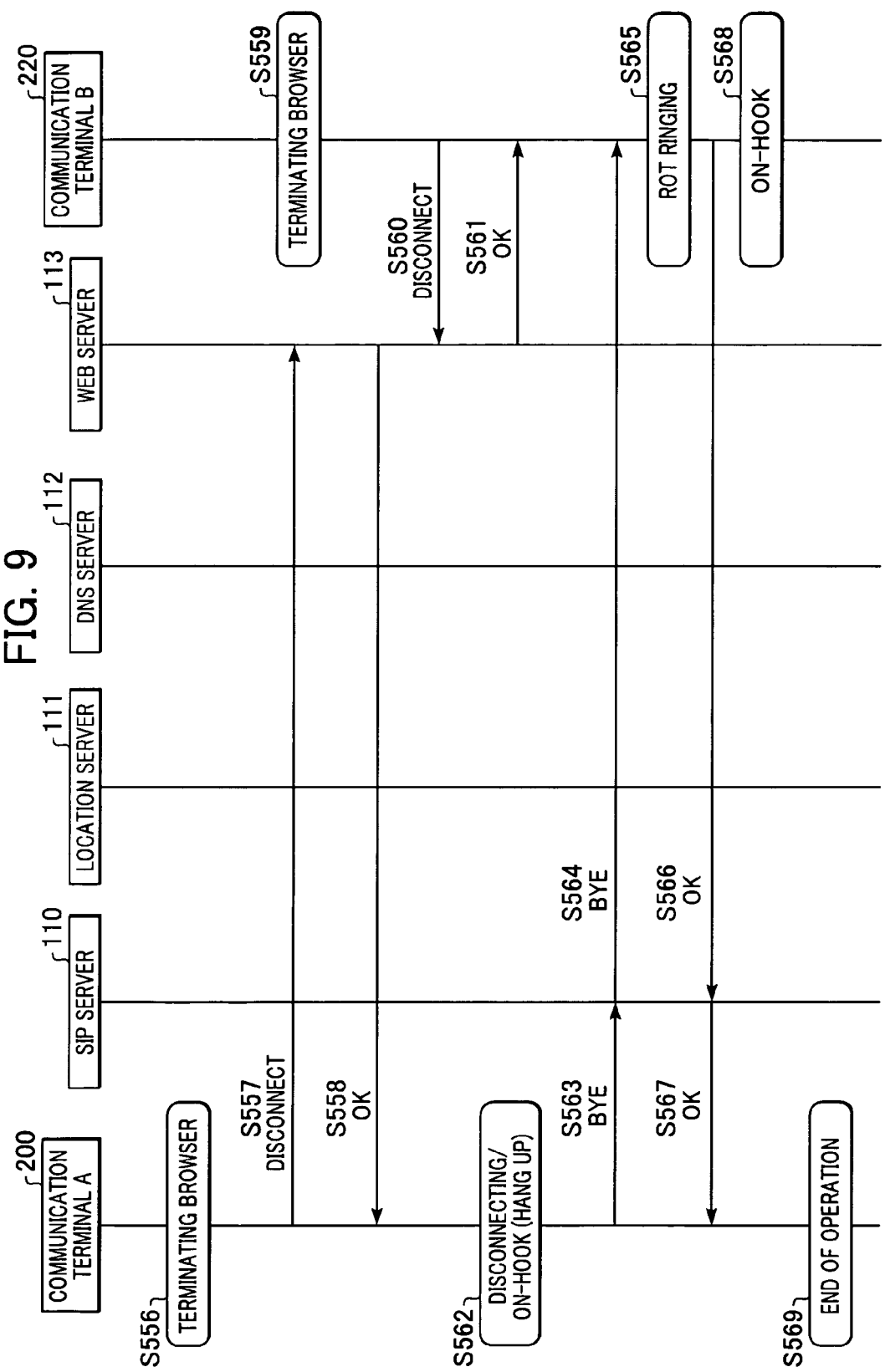

FIG. 17

1700 ONE-TOUCH KEY REGISTRATION REGIONS
(203a)

| KEY | PHONE NUMBER | OTHER PARTY NAME | EXTENSION SPACE |
|---|---|---|---|
| 01 | 03-XXX-XXXX | | |
| 02 | http://xxx.xxx.com | | |
| 03 | 05-XXX-XXXX | | http://YYY.zz.com |
| 04 | 03-XXX-XXXX | | |
| 05 | ⋮ | ⋮ | |

1701　1702　1703　1704

1705 — 02
1706 — 03 ing Internet resources.

COMMUNICATION TERMINAL, CONTROL METHOD OF THE SAME, AND CONTROL PROGRAM OF THE SAME

BACKGROUND OF THE INVENTION

1. Field of the Invention

The present invention relates to a communication terminal, connected to an IP network for making telephone calls using a predetermined IP phone method, and having browsing means for browsing Internet resources, and also relates to a control method thereof, and a control program thereof.

2. Description of the Related Art

In recent years, the Internet has rapidly come into worldwide use, and Internet phones (hereafter, referred to as "IP phones") are gathering attention due to the ability thereof to provide users an advantage of markedly reduced communication charges. The currently leading standard in Internet phones is VoIP (ITU-T Recommendation H.323, etc.), and various types of Internet-phone-compliant equipment conforming to this standard have been proposed.

Conventionally, equipment configurations for browsing contents (Web pages, FTP or Gopher directories, Net news, etc.) on the Net using a computer (i.e., browsing such contents with a protocol such as HTTP, FTP, Gopher, NNTP, or the like, most commonly using Web browser software), and equipment configurations for making phone calls using an IP phone, have been made separately. However, in recent years, equipment integrating these two configurations is being realized. Such integrated equipment has various advantages, such as enabling Net contents to be browsed while talking on a telephone, enabling phone calls to be made by specifying phone number information of net contents, and so forth. Of these, the function for browsing net contents while talking on the telephone is different from conventional telephone functions, and accordingly, various types of services and so forth will likely be developed from now on.

However, with the current state of such terminals, it is necessary for a user using the equipment to actively browse contents. That is to say, user operations for using the telephone and user operations for browsing contents are different operations, leading to a problem wherein it is necessary for the user to separately perform contents browsing operations which are more complex than phone operations, besides performing phone operations, so improvement in usability is desired.

Also, in conventional configurations, all control is performed manually, for both phone calls and browsing net contents, and accordingly, in the event that both terminal users between which a call is currently established want to browse Net contents of the same page, for example, complex operations are necessitated, such as each terminal user operating his/her own terminal to browse target net contents while informing each other of the URL of the intended Net contents using voice communication, or one terminal user creating an e-mail containing the URL of the intended Net contents and sending to the other terminal user, with the other terminal user browsing the net contents with reference to the received URL.

Accordingly, with communication terminals capable of making IP calls and browsing Internet resources, a configuration such that calling and receiving parties can share the same Internet source with easy operations, is desired, such as a configuration wherein the other party can browse the current Internet source being browsed with easy operations, for example.

SUMMARY OF THE INVENTION

It is an object of the present invention to solve the above-described problems, so that both calling and receiving parties can browse the same Internet source with easy operations during communication using communication terminals capable of making phone calls and browsing Internet resources.

According to a first aspect of the present invention, a communication terminal, connected to an IP network for making a phone call using a predetermined IP phone method, and also having browsing means for browsing Internet resources, comprises operating means for allowing browsing means of a communication terminal of another party, with which IP phone conversation has been established, to browse a desired Internet resource.

According to a second aspect of the present invention, with a control method of a communication terminal connected to the IP network for making a phone call using a predetermined IP phone method, and also having browsing means for browsing Internet resources, the browsing means of the communication terminal of the other party with which IP phone conversation has been established browses a desired Internet resource in response to specific operating means operations.

According to a third aspect of the present invention, a control program of a communication terminal connected to the IP network for making a phone call using a predetermined IP phone method, and also having browsing means for browsing Internet resources, comprises a control step for allowing the browsing means of the communication terminal of the other party with which IP phone conversation has been established to browse a desired Internet resource in response to specific operating means operations.

Further objects, features and advantages of the present invention will become apparent from the following description of the preferred embodiments with reference to the attached drawings.

BRIEF DESCRIPTION OF THE DRAWINGS

FIG. 6 is an explanatory diagram illustrating the sequence of IP phone communication performed by the terminal shown in FIG. 1.

FIG. 7 is an explanatory diagram illustrating the sequence of IP phone communication performed by the terminal shown in FIG. 1.

FIG. 8 is an explanatory diagram illustrating the sequence of IP phone communication performed by the terminal shown in FIG. 1.

FIG. 9 is an explanatory diagram illustrating the sequence of IP phone communication performed by the terminal shown in FIG. 1.

FIG. 17 is an explanatory diagram illustrating the configuration of one-touch registration memory of the terminal shown in FIG. 1.

DESCRIPTION OF THE PREFERRED EMBODIMENTS

The following is a detailed description of embodiments of the present invention, with reference to the drawings.

With the present specification, including the appended claims, the terms "Internet" and "Internet resources" are used, with former representing the IP network, and the latter representing accessible data (including files, directory lists, and so forth) and other resources on the IP network via the IP. That is to say, with the present specification, the term "Internet" means simply the same as an IP network, this concept including closed IP networks such as so-called intranets within corporations or other organizations, besides the so-called "Internet" which is publicly-accessible and very wide-area, and the term "Internet resources" representing accessible data on these networks via IP. Using these terms is unavoidable, since a suitable leading conceptual term, such as "IP network resource", has not become commonplace as of yet.

Figure 1:
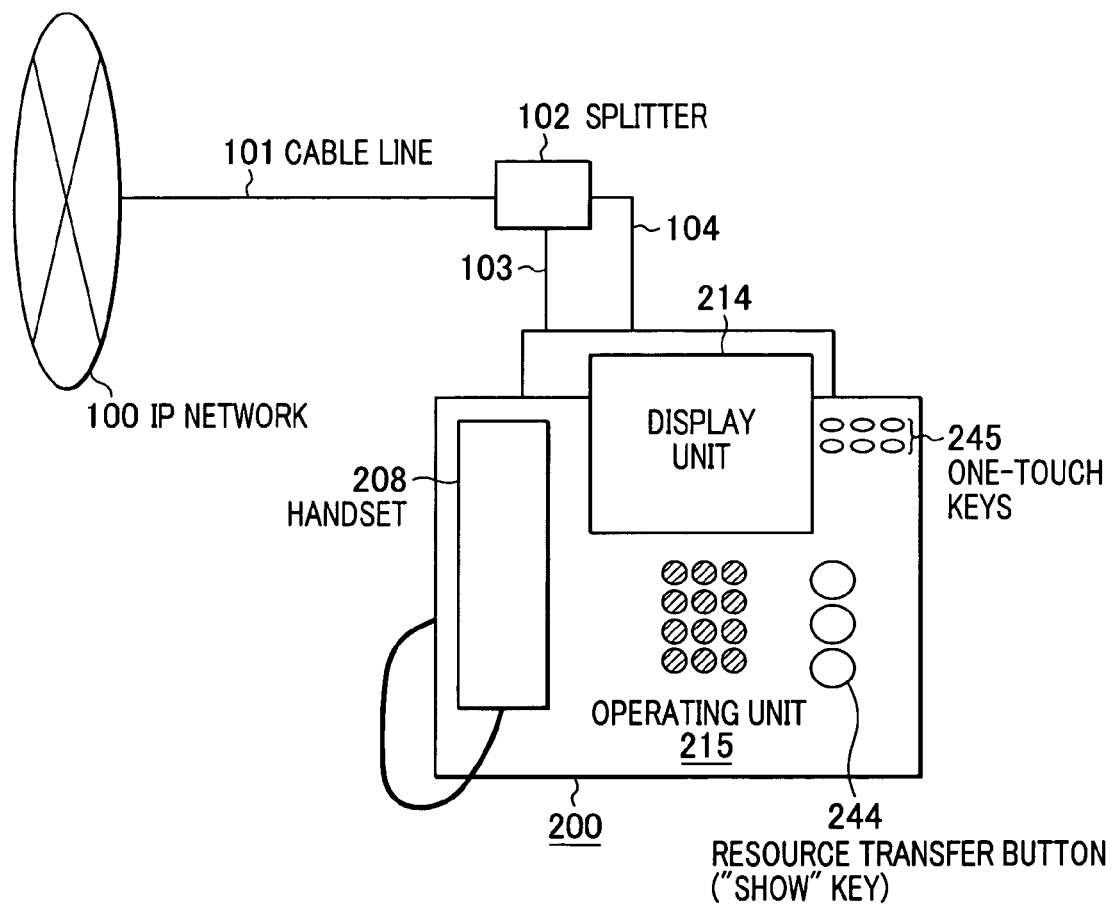
FIG. 1 is an explanatory diagram illustrating the configuration of a communication terminal to which the present invention has been applied.

FIG. 1 illustrates the configuration of a communication terminal having an IP phone function and Web browser function according to the present invention. In FIG. 1, reference numeral 100 denotes an IP network (this term is to be understand to mean the Internet network except in cases wherein there is the need to be distinguished otherwise, though closed networks such as intranets can be understood to be included besides the so-called Internet) where an information terminal 200 is connected via a cable line 101. With the present embodiment, the cable line 101 is ADSL (asynchronous direct subscriber line), with the line of the information terminal in FIG. 1 being divided into a band 104 for a PSTN network, and a band 103 for the ADSL network, using a splitter 102.

The information terminal 200 allows the user to use voice communication (for example, phone calls and facsimiles), Internet connections (using ADSL connection methods such as PPPoE (PPP over Ethernet)), and resources on the Internet (with the present embodiment, at least browsing Web pages, sending/receiving e-mail, and the like, besides IP phone functions). Note that the cable line 101 connected to the IP network 100 is not restricted to ADSL, rather, optional line media such as optic fiber lines, CATV lines, wireless lines, or the like, can be employed.

The information terminal 200 shown in FIG. 1 comprises a display unit 214 formed of a liquid crystal display unit or the like, an operating unit 215 including a numeric keypad, various types of function keys, and a handset 208 for inputting/outputting voice communication. The display unit 214 and the operating unit 215 are employed for realizing Web browsing functions as well as for controlling calls.

The operating unit 215 is formed of a keyboard, a pointing device, function keys, or the like, and makes up the user interface along with the display unit 214. The operating unit 215 accepts user operations regarding Web browsing operations, printing, calling/reception/registration and so forth, and is employed for notifying a CPU 201 of user operations. The operating keys of the operating unit 215 include, for example, dial keys for inputting numerals 0 to 9 and symbols * and #, alphabetical characters, symbols, and so forth, so as to enable dialing of numbers, inputting URLs, and so forth. The operating keys also include sending and receiving keys for controlling sending/receiving of facsimiles, an off-hook key for controlling on/off control of a line, a hold key, selection keys for setting functions, and so forth.

Also, with the operating unit 215, a resource transfer button 244 and one-touch keys 245 are provided in particular. Of these, the resource transfer button 244 is pressed by the user to specify that an Internet resource is to be shared by the terminals making an IP phone call, during the call. Specifically, this button is pressed when the user wants to show the other user an Internet resource (such as a Web page) which the user is now browsing, and accordingly, the name of this resource transfer button 244 may be a "show" button, for example, or some other appropriate name.

Also, the one-touch keys 245 are a key group made up of multiple keys provided on this kind of phone or facsimile equipment, which enables information of the other party to be registered. With a known arrangement of such one-touch keys, phone numbers and names of other parties can be registered with each button, and upon one of the one-touch keys 245 being pressed, the station of the other party can be called.

With the present embodiment, in addition to the above-described information of the other party, the URL information of an Internet resource, and further, a combination of specific information of the other party and the URL information of the Internet resource which the user wants to show the other party (in order to send URL information at the time of making a phone call to show the other party the URL information), as well as can be registered with the one-touch keys 245. Detailed description will be made later regarding the one-touch keys 245.

Figure 2:
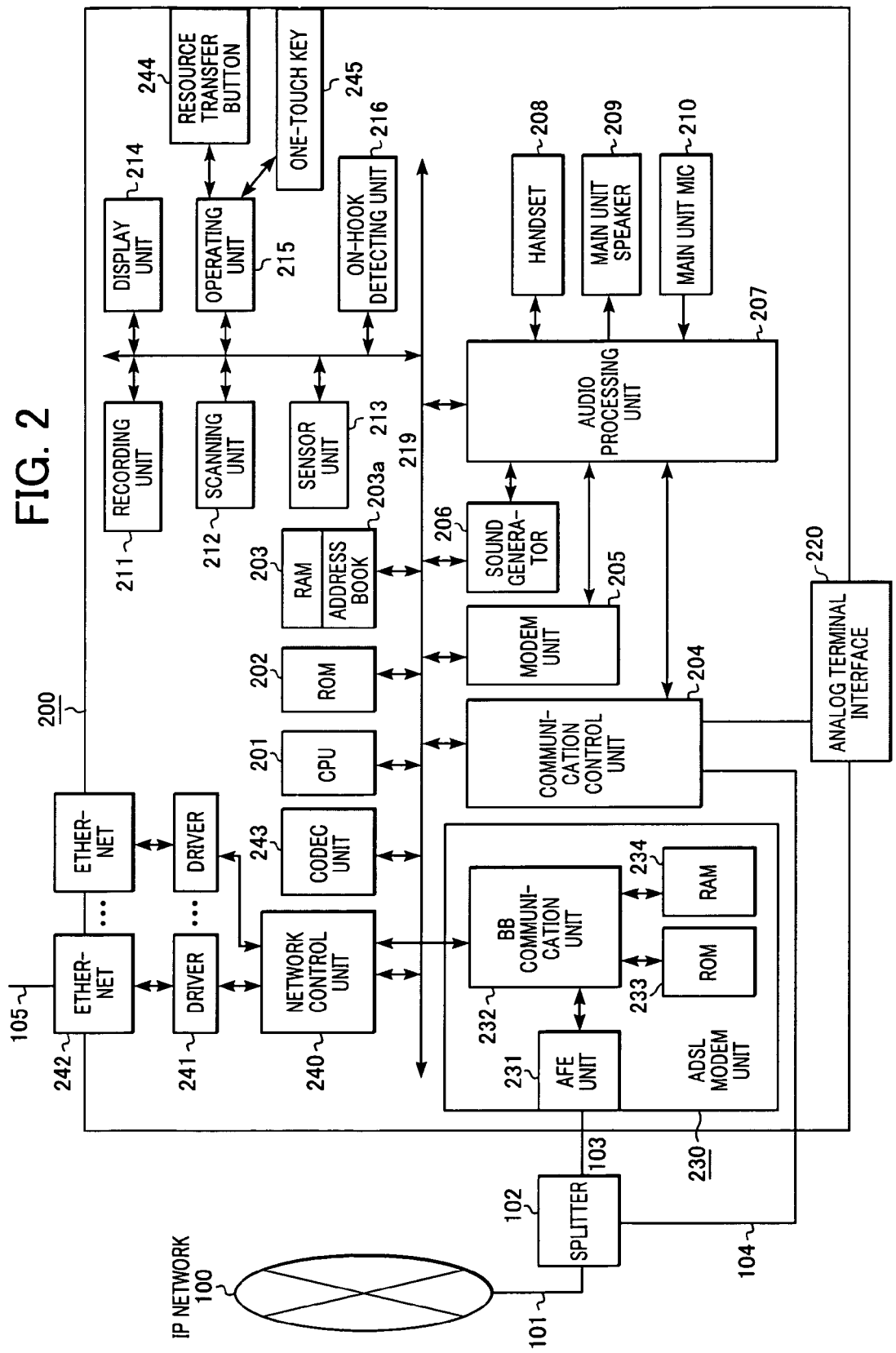
FIG. 2 is a block diagram illustrating the configuration of the control system of the terminal shown in FIG. 1.

FIG. 2 illustrates the configuration of the information terminal 200 shown in FIG. 1. The control system in the drawing is for realizing facsimile functions (not shown in FIG. 1) besides IP phone functions and Web browsing functions with the information terminal 200.

In FIG. 2, the CPU 201 inputs a signal from each unit via a data bus 219 so as to control each component connected to the data bus 219 according to this input signal. That is to say, the CPU 201 controls the entire system according to a program stored in ROM 202, and executes processing by connecting to the network and controlling various types of protocols. It is needless to say that operating, display, scanning, and recording, are also controlled by the CPU 201.

Moreover, the CPU 201 executes broadband connection control, control for realizing IP phone calls, Web access control, browser control for displaying Web pages, detecting IP addresses, data extracting control, creating files for sending data such as URL and so forth, and transmission/reception control.

Also, the ROM 202 is memory in which programs are stored, and is formed of mask ROM or flash ROM. Moreover, an arrangement may be made wherein the ROM 202 is made of flash ROM or EEPROM in the event that writing and erasing data is required. The ROM 202 stores programs for all of the control executed by the CPU 201.

RAM 203 is used as a work area at the time of the CPU 201 executing processing, and also as an area to be used at the time of executing each processing such as phone calls, browsing the Web, and transmission/reception of e-mail, and at the time of scanning, recording, and processing audio CODEC data. Temporary data is stored here, unlike the ROM 202.

Moreover, part of the RAM 203 is backed up with batteries or the like, to store time data, settings of various types of service functions, content registered to an address book (phone book), and so forth. Of such regions, the region of the address book 203a is illustrated in FIG. 2 in particular.

In this address book 203a, phone numbers acquired by number display and the like at the time of a normal phone call, IP addresses acquired at the time of IP phone communication, the user name and mail address corresponding to the selection information, and further, the user name and mail address of the user of the terminal, are stored beforehand in accordance with predetermined setting operations. The registration information of the above-described one-touch keys 245, the registration information of other quick-dial operations, and so forth, is also stored in this address book 203a. Also, an arrangement may be made wherein the storage region for management information such as the address book 203a is made up of EEPROM as nonvolatile memory and so forth.

The RAM 203 is also used as a buffer for temporarily storing IP addresses detected in IP phone connection procedures, as a buffer for transmitting/receiving files, and as a receiving buffer for displaying Web pages.

A communication control unit 204 is an interface for accommodating an analog (PSTN) public line (the analog band 104 divided by the splitter 102), and in a case of an analog line, comprises: a polarity-matching circuit connected to the phone line (hereafter, referred to as "subscriber line") of a station switchboard and made up of a full-wave rectifier using diodes for matching the polarity of the voltage of the line; a ringer detecting circuit connected to the subscriber line of the station switchboard for detecting a calling signal from the station switchboard; a pulse transmission circuit for forming a line loop when off-hook operations are performed, and also transmitting dial pulses to the station switchboard; and a transformer circuit for performing two-line/four-line conversion. Moreover, a standard analog terminal can be connected to the information terminal 200 by providing an analog terminal interface 220 connected externally.

Reference numeral 205 denotes a MODEM (MOdulator/DEModulator) unit, comprising DSP and AFE (analog front end), which realizes facsimile modem functions for transmitting/receiving faxes using the Group3 facsimile (G3 fax) protocol, under the control of the CPU 201. The MODEM unit 205 further includes a number display function for analyzing modem data (number display data), and an echo canceller function, and further realizes a speaker-phone function.

A sound generator 206 is a sound source for on-hold music and melodies signaling incoming calls, and includes a sound source data generating function which can reproduce sound source data stored in the ROM 202 or the RAM 203 as analog signals under control of the CPU 201. The sound generator 206 further serves as a sound source for call progress tones such as pseudo-DT, BT, RBT, and so forth.

Reference numeral 207 denotes an audio processing unit, and the CPU 201 performs audio path control with regard to the audio processing unit 207 to process signals from the MODEM (DSP) 205, input/output signals of the sound generator 206, a later-described handset 208, a speaker 209, a main unit microphone 210, a communication control unit 204, and so forth.

The handset 208 in FIG. 1 is used for inputting/outputting voice in phone calls on conventional lines and IP phones. The on-hook/off-hook state of the handset 208 is detected by an on-hook detecting unit 216, and the on/off state of the line is controlled by this on-hook/off-hook state.

The speaker 209 is used for monitoring at the time of outputting incoming sound and stored voice data, and for performing speaker-phone calls. The main unit microphone 210 is used for inputting voice at the time of using the speaker-phone function.

A recording unit 211 is made up of known recording means such as a thermo-sensitive or heat-transfer printer, a laser beam printer, an ink jet printer, or the like, which decodes MH, MR, or MMR encoded digital data in a case of facsimile recording so as to record this decoded data. Also, in the event that data is printed from the Web browser, the RAM 203 is used as a display buffer, with one page of Web data written in a markup language (usually HTML) stored in the RAM 203 is converted into display data, and then the amount of the converted display data which can be displayed within one screen of the display unit 214 is stored in the display buffer of the RAM 203. Upon the Web browser terminating storing the display data to the display buffer, the Web browser notifies the recording unit 211 of starting for recording.

Upon the recording unit 211 receiving the notice, the recording unit 211 reads out data from the display buffer, and then converts the readout data to print data one line at a time so as to transfer the print data to the recording means. Upon the recording unit 211 completing this transfer, the recording unit 211 gives the Web browser and end notice for transfer. Upon the Web browser receiving the end notice for transfer, in the event that there is next display data, the Web browser stores the next display data to the display buffer, and then notifies the recording unit 211 of this state, on the other hand, in the event that all of the one page of Web data has been displayed, i.e., there is no display data remaining, the Web browser notifies the recording unit 211 of the page end. The above-described processing is repeated so as to transfer all of the one page of Web data to the recording unit 211, thereby performing Web printing.

A scanning unit 212 including known document scanning means such as a CCD, a contact sensor array, or the like, converts analog data scanned by the scanning means to digital data, and then in facsimile communication, the scanning unit 212 encodes this converted data so as to output the encoded data using a known encoding method such as MH, MR, or MMR encoding, or the like.

Reference numeral 213 is a sensor unit, which detects the presence of a document to be transmitted on the scanning unit 212, and the size thereof, to notify the CPU 201 of the results. The sensor unit 213 also detects the presence of a document to be transmitted on the recording unit 211, and the size thereof, to notify the CPU 201 of the results.

The display unit 214 shown in FIG. 1 is made up of liquid crystal components such as color LCD, monochrome LCD, and so forth, and is used for displaying various types of information. The display processing performed by the display unit 214 includes display of the HTML information received from a server on the Internet, display of time, display of the line state during a phone call, display of states such as errors, monitor display of other operational states, display of key-input character messages from the operating unit 215, display of received character messages, and display of the settings of various types of service functions provided by the telephone.

The operating unit 215 corresponds to that shown in FIG. 1, which is made up of a keyboard including a numeric keypad, function keys, and so forth, and further, a pointing device such as a mouse, and makes up the user interface along with the display unit 214. The operating unit 215 accepts all user operations regarding Web browsing operations, calling/reception/registration and so forth, and then notifies the CPU 201 of the content thereof.

A network control unit 240 controls various types of protocols regarding the Internet communication. While the network control unit 240 is shown as a circuit block for the sake of simplicity, the basic control is actually performed by the software of the CPU 201. The network control unit 240 controls input/output of a NIC (Network Interface Card) 242 (multiple cards can be provided as shown in the drawing) via a driver unit 241 (commonly referred to as the PHY) using the MII interface, and also controls input/output of an ADSL modem unit 230.

As for the NIC 242, an NIC conforming to an interface method such as CSMA/CD (Ethernet) can be employed. The NIC 242 is connected to the data bus 219 via the driver 241. Though the NIC 242 is employed for communicating to other equipment connected to the LAN 105, this is not indispensable in the later-described control. Also, while the multiple NICs 242 are provided so as to connect to a LAN belonging to a different IP segment in FIG. 2, the number thereof is optional, and only a single NIC may be provided depending on the arrangement.

In network communication, input/output between circuit blocks in FIG. 2 around the network control unit 240 is performed as follows. Communication of IP phones is performed using VoIP described in the ITU-T Recommendation H.323, for example. With VoIP, various types of protocols such as IP (Internet Protocol), UDP (User Datagram Protocol), RTP (Transport Protocol for Real-Time Application), RSVP (Resource Reservation Protocol), and so forth, are used.

With IP phones, voice signals input from the handset 208 are processed through the audio processing unit 207, CODEC processing for audio processing is performed by a CODEC unit 243, and voice signals are transmitted/received as digital data through encoding/decoding conforming to an encoding format such as ITU-T Recommendation G.711 or G.729, or the like. Protocols such as SIP, ITU-T Recommendation H.323, MCGP, and so forth, are employed in order to identify the IP address of the other party.

With the present embodiment, the information terminal 200 communicates with the Internet, and also communicates with the LAN via the NIC 242, i.e., forwards packets between different network segments. Accordingly, the network control unit 240 preferably includes router functions for transferring packets between different network segments, and NAT functions for performing conversion of addresses/port Nos.

The NAT function allows the terminal to transparently access the Internet through a node which only a local IP address is assigned to by mutually converting a private IP address and an originally global IP address which can be used for accessing the Internet. DHCP is also provided so as to dynamically assign an IP address to the terminal to be connected to the LAN at the startup stage, and so as to release the IP address from the terminal at the ending stage.

In the event that the ADSL modem unit 230 is connected to an ADSL network, a protocol such as PPPoE or the like is employed. At the authentication stage when connecting to the ADSL network, a protocol such as PAP/CHAP or the like is employed, and accordingly, the network control unit 240 needs to have such an authentication protocol.

The network control unit 240 is connected to the ADSL modem unit 230 via interface such as the UTOPIA. The ADSL modem unit 230 is a communication control unit to be connected to the Internet through the ADSL network, which is connected to the public line (the band 103 for the ADSL network) divided by the splitter. The ADSL modem unit 230 is made up of the AFE unit 231 and BB communication unit 232, and the ADSL modem unit 230 is connected to the ROM 233 for storing ADSL modem programs and to the RAM 234 to serve as a data work area.

Figure 3:
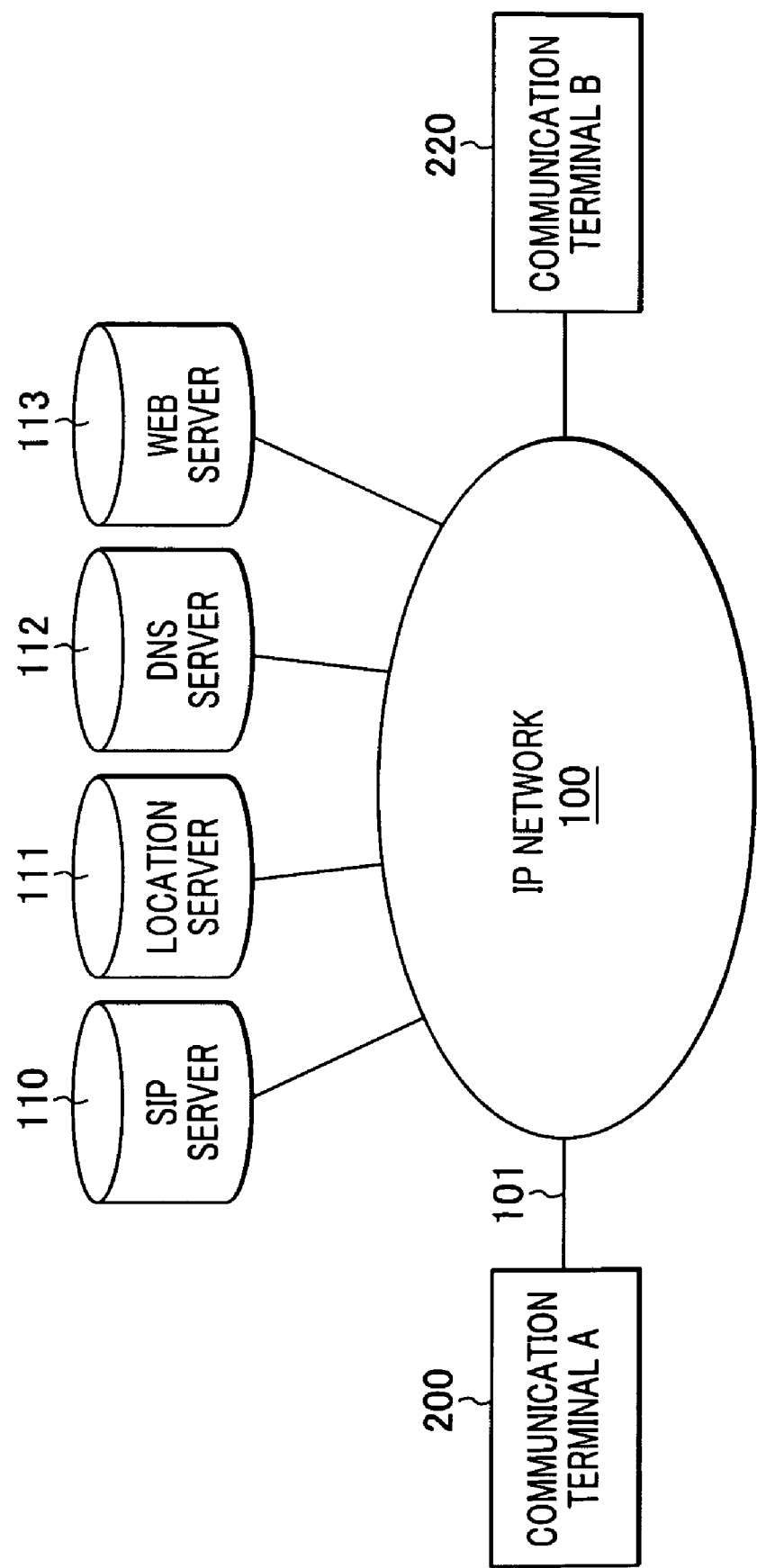
FIG. 3 is an explanatory diagram illustrating the communication environment configured of the IP network over which the terminal shown in FIG. 1 communicates.

FIG. 3 illustrates the notional configuration of the IP network. As shown in FIG. 3, the communication terminal 200 according to the present embodiment is connected to the IP network 100 via the public line 101, and communicates with the communication terminal 220 of the other party. The arrangement shown in FIG. 3 assumes a state wherein the communication terminal (A) 200 and communication terminal (B) 220 are connected to the same Internet service provider (ISP).

On the IP network are provided a SIP server 110 used for call connections with IP phones, a location server 111 for managing a phone number/IP address matching table, a DNS server 112 for managing an IP address and domain/host name matching table, and a Web server 113.

Figure 4:
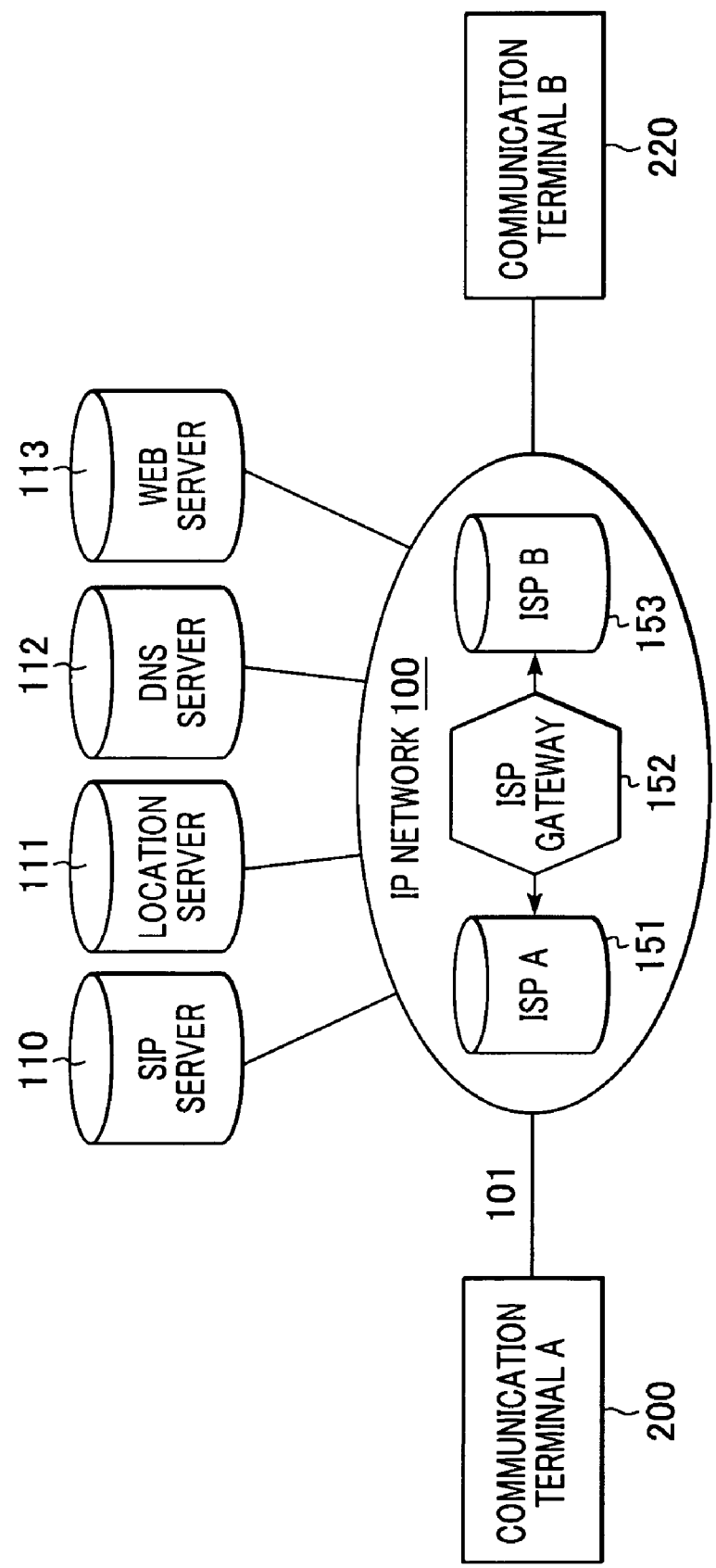
FIG. 4 is an explanatory diagram illustrating another configuration of the communication environment where the terminal in FIG. 1 communicates.

Although FIG. 4 has the same configuration as that shown in FIG. 3, FIG. 4 illustrates a state wherein the IP network 100 is connected to the communication terminal (A) 200 and the communication terminal (B) 220 via different Internet service providers (ISP: 151 and 153). As for Internet connection arrangements, either one of the connection arrangements in FIGS. 3 and 4 can be selected, depending on the other party. In FIG. 4, the communication terminal (A) 200 is connected to the IP network 100 via the ISP (A) 151, and the communication terminal (B) 220 is connected to the IP network 100 via the ISP (B) 153.

In the case of the arrangement shown in FIG. 4, an ISP gateway 152 for connecting different service providers acts as a gateway between different ISPs, thereby enabling communication between the communication terminals 200 and 220. Note that the ISP gateway 152 is not always configured of a single device, and an arrangement may be made wherein the ISP gateway 152 is configured of a plurality of gateway devices.

With the IP phone communication according to the present embodiment, the SIP method is employed. Now, let us assume that the calling side is the communication terminal 200, and the receiving side is the communication terminal 220. With the SIP method, the communication terminal 200 of the calling side transmits a calling message to the SIP server 110 so as to request the SIP server 110 to connect to the terminal 220 of the other party. The SIP server inquires the IP address of the terminal 220 of the other party of the location server 111, and establishes an IP connection between the communication terminals 200 and 220 using the acquired IP address.

Next, with the above-described configuration, a different arrangement regarding communication control for sharing Internet resources between the communication terminals between which a phone call is established using the IP phones will be described. Here, let us consider Net contents (typically a Web page) which can be displayed by the Web browser, as an Internet resource shared between the communication terminals between which a phone call is established.

FIGS. 5 through 9 illustrate an IP phone communication sequence according to the present embodiment. With the IP phone communication shown in FIGS. 5 through 9, a call connection from the communication terminal A to the communication terminal B, which are configured as shown in FIGS. 1 and 2, is established so as to make a phone call. With the present embodiment, the communication terminal A performs Web browsing, and also transfers URL data thereof to the communication terminal B during IP phone communication so as to share the same Web information between the communication terminals (hereafter, sometimes simply referred to as "terminal") A and B. Note that the SIP server 110, location server 111, DNS server 112, and the Web server 113 shown in FIGS. 5 through 9 are the same as those shown in FIG. 3 or 4.

The communication sequence in FIGS. 5 through 9 is realized by the CPU 201 in FIG. 1 executing a communication control program. This communication control program of the CPU 201 is stored in the ROM 202, for example (the same in the later-described other embodiments as well). Each step of the communication sequence in FIGS. 5 through 9 is denoted by S501 and on. With the communication in FIGS. 5 through 9, let us assume that the ADSL connection has already been established such that the terminals A and B are connected to the IP network.

Here, description will be made regarding actions wherein a call connection from the terminal A to the terminal B is performed, the terminal A browses Web information using the Web browser, and further, the terminal A transfers URL data to the terminal B, and then the terminal B makes a Web connection based on the received URL data.

Figure 5:
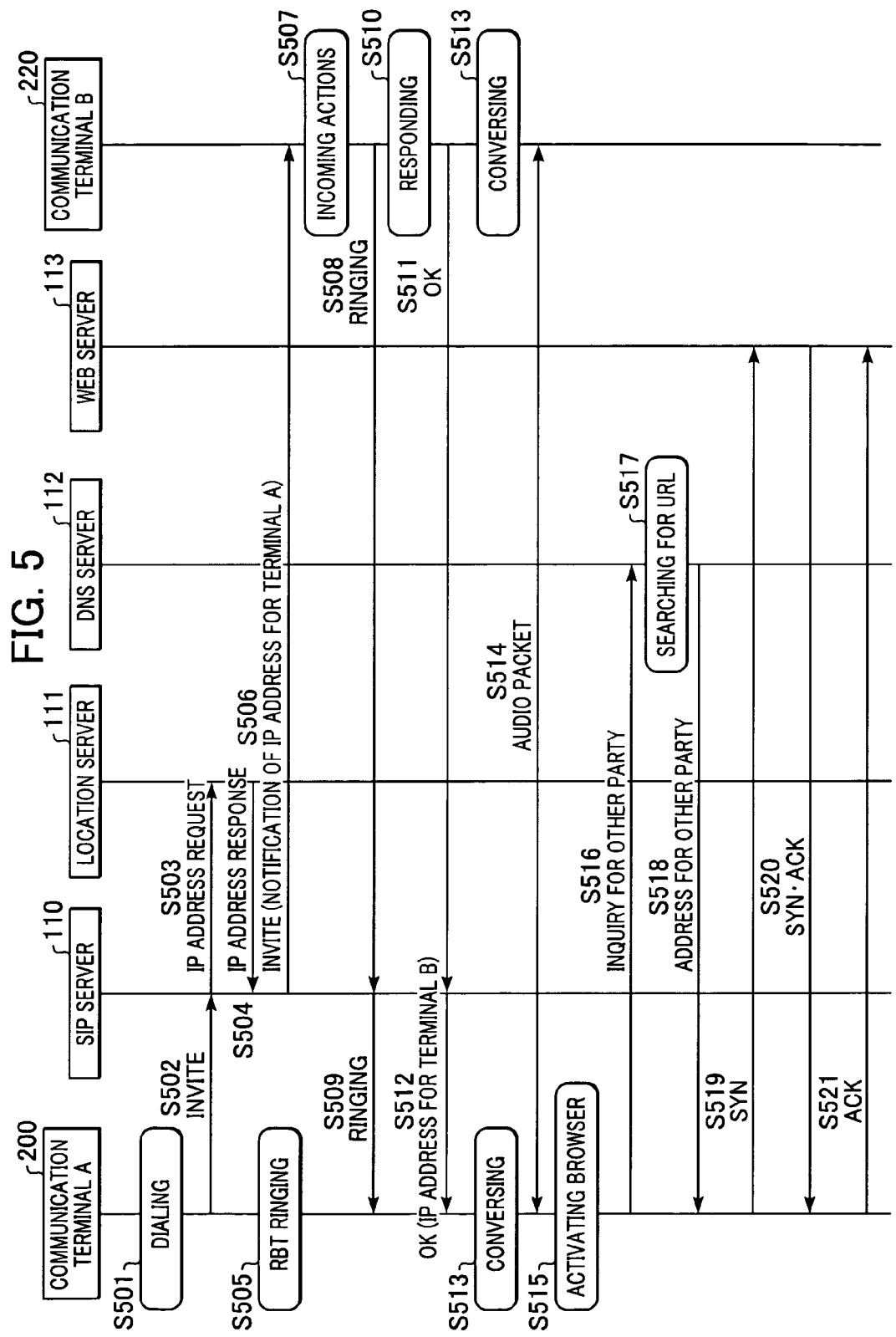
FIG. 5 is an explanatory diagram illustrating the sequence of IP phone communication performed by the terminal shown in FIG. 1.

First, at the terminal A, the user performs dialing operations using the operating unit 215 (S501 in FIG. 5). Thus, the terminal A is connected to the SIP server 110 due to an INVITE message (S502). The SIP server 110 requests an IP address of the location server 111 (S503), the location server 111 searches for the IP address corresponding to the specified phone number so as to transmit the acquired IP address to the SIP server 110 (S504). During these actions, a RBT (Ring Back Tone) is ringing at the terminal A (S505).

Now, the SIP server transmits an INVITE request to the terminal B based on the received IP address of the terminal of the other party so as to make a connection request (S506). At this time, the terminal B obtains the IP address of the calling side terminal A.

The terminal B makes a transition to reception actions due to the INVITE request from the SIP server (S507). Subsequently, the terminal B returns a ringing signal indicating a calling state to the SIP server (S508), and then the SIP server transmits the ringing signal to the terminal A (S509).

Upon the terminal B responding (S510), OK information indicating completion of the connection is transmitted to the SIP server 110 (S511), the SIP server 110 transmits the OK information to the terminal A, and then the terminal A also obtains the IP address of the terminal B of the other party (S512).

Subsequently, transmission/reception of audio packets is enabled using the IP connection generated between the terminals A and B (S513), and then the terminals A and B make a transition to a phone call state (S514). In general, communication using VoIP, which emphasizes real-time response, is performed based on UDP including messages, but communication based on TCP connection may be selected.

The terminal A is connected to the IP network, and accordingly, is able to use resources on the Internet such as Web pages, transmission/reception of e-mail, and so forth.

In the course of the phone call between the terminals A and B, there is the probability that an Internet resource such as a specific Web page will come up in the conversation. As described above, conventionally, information regarding the URL of a Web page has been exchanged by voice during an IP phone call, however, with the present embodiment, an example wherein the terminal A transmits the URL of the Web page to the terminal B such that the terminal B can browse the Web page, will be shown.

Upon the terminal A activating the Web browser (S515) and receiving the URL from the operating terminal 215, the terminal A makes an inquiry regarding the address of the Web server 113 specified by the URL, to the DNS server 112 (S516). The DNS server 112 which has received the inquiry searches for the address of the Web server 113 based on the URL (S517), and then returns the search results to the terminal A (S518).

The terminal A accesses the Web server 113 based on the IP address obtained from the DNS server. The terminal A transmits a SYN packet to the Web server 113 (S519), and receives a SYN-ACK packet from the Web server 113 (S520), and then transmits an ACK packet corresponding to the SYN packet of the other party to the Web server 113 (S521).

Upon synchronization between the terminal A and the Web server 113 having been established, the terminal A requests the Web server 113 for a Web page to be browsed (S522 in FIG. 6), and then obtains the data of the Web page from the Web server 113 (S523). The terminal A which has received the data of the Web page displays the Web page with the browser (S524).

The terminal A transfers the URL so as to let the terminal B of the other party display the displayed Web page. In the event that the terminal A user wants to have the terminal B user browse the content of the Web page, the terminal A user presses the resource transfer button 244 on the operating unit 215 (S524a).

Examples of operations to activate sharing of resources which can be conceived include operations (including operations using a pointing device) using the tool bar of the display unit 214, using an appropriately-named button such as "URL transfer" on the console which is prepared as a Web browser window, and so forth, besides the operation of the above-described resource transfer button 244, and arrangements may be made which enable any or all of these can be made.

With the present embodiment, the terminal A transfers the URL information to the terminal B using FTP (File Transfer Protocol), and accordingly, a file in which the URL is described is generated at the terminal A (S525). This file including the URL is described using SOAP (Simple Object Access Protocol: RFC3288) which is an upper protocol of FTP, such that the receiving terminal B can activate the browser.

With FTP, two connections are employed, one being control connection and the other data (file) transfer connection. First, the terminal A synchronizes its own control port with that of the terminal B based on the IP address of the terminal B obtained from the location server. The terminal A transmits a SYN packet to the terminal B (S526), receives a SYN-ACK packet from the terminal B (S527), and then transmits an ACK packet corresponding to the SYN-ACK packet of the other party, to the terminal B (S528). The terminal B transmits a ready packet to the terminal A, indicating that the terminal B is ready to start the FTP communication (S529).

The terminal A attempts to login to the terminal B (S530), upon which the terminal B permits the login of the terminal A (S531). As for the authentication method of this FTP login, the IP connection has already been established, and accordingly the so-called anonymous FTP method is preferably employed, which assigns "anonymous" to the user name, and an e-mail address to the password. Considerable security can be ensured even with the anonymous FTP method, by accepting FTP logins only from other parties with which IP phone calls are already established.

However, with the authentication sequence, exchanging information unique to the mutual terminals may further improve security. For example, according to the configuration in FIG. 2, the address book 203a is provided, so upon the terminal A transmitting its own mail address to the terminal B, the terminal B determines whether or not the mail address from the terminal A is stored in the address book 203a, and in the event that the mail address is stored in the address book 203a, the terminal B permits the FTP login from the terminal A. Such FTP login sequence can be automatically executed without user input, and moreover, employing the above-described authentication using information of the address book does not require complex operations, thereby preventing the FTP login of unspecified other parties and ensuring security.

Subsequently, the terminal A prepares a port besides the control port, for transferring URL data (S532), and transfers the URL data to the terminal B using this data transfer port (S535 in FIG. 7). First, the terminal A synchronizes the data transfer port with that of the terminal B (S533 and S534). The terminal A transmits the file in which the URL is described to the terminal B via the data transfer port (S536). Upon the terminal B receiving the file, the terminal B returns an ACK packet to the data transfer port of the terminal A so as to notify the control port of the terminal A of end of reception (S537).

Upon the transfer of the URL data being completed, the terminal A releases the port for transferring URL data (S538). The terminal A transmits a port release request from the data transfer port to the terminal B (S539), and the terminal B returns an ACK packet to the data transfer port of the terminal A (S540). Upon the terminal A receiving this, the terminal A releases the port for transferring URL data, and ends transfer of the URL data (S541). The terminal A notifies the terminal B of end of the FTP (S542), and then receives an ACK packet from the terminal B (S543).

Upon the terminal B receiving the file described in the SOAP (S544), the terminal B analyzes the received URL data (S545). With SOAP, the handling method of the received data file can be specified, so the terminal B activates the browser according to the SOAP (S546 in FIG. 8), and enters the URL received from the terminal A to the browser. The terminal B makes an inquiry to the Web server 113 regarding the address specified by the URL of the DNS server 112 (S547). The DNS server 112 which has received the inquiry searches for the address of the Web server 113 based on the URL (S548), and returns the search results to the terminal B (S549).

The terminal B accesses the Web server 113 based on the IP address obtained from the DNS server 112. First, the terminal B transmits a SYN packet to the Web server 113 (S550), receives a SYN-ACK packet from the Web server 113 (S551), and then transmits an ACK packet corresponding to the SYN of the other party (S552). Upon synchronization being established, the terminal B requests the Web page of the Web server 113 (S553), and obtains the data of the Web page from the Web server 113 (S554). The terminal B which has received the data of the Web page displays the Web page with the browser (S555).

The terminal A which has finished browsing using the Web browser quits the browser (S556 in FIG. 9), transmits a disconnect message to the Web server 113 (S557), and receives an OK signal (S558). Upon the terminal B having completing browsing, the terminal B quits the browser (S559), transmits a disconnect message to the Web server 113 (S560), and receives an OK signal (S561).

Termination of the phone call is performed from the terminal A side in the case shown in FIG. 9. BYE and OK messages are exchanged between the terminals A and B via the SIP server 110 based on the VoIP and SIP procedures (S563, S564, S566, and S567), and at the terminal B side, ROT ringing (S565) and on-hook (S568) is performed, and the IP phone call sequence ends (S569).

Note that the above-described transmission operations of URL data can be repeated many times during a phone call. At this time, for example, an arrangement may be made wherein the resource transfer button 244 is pressed each time an Internet resource is changed at the terminal A (for example, in the event that the currently displayed Web page is displayed again, or in the event of jumping to another Web page), or another arrangement may be made wherein the terminal A automatically transmits the URL data to the terminal B each time an Internet resource is changed at the terminal A (for example, in the event that the currently displayed Web page is displayed again, or in the event of jumping to another Web page) until the phone call terminates (or until other explicit operations are performed).

Figure 10:
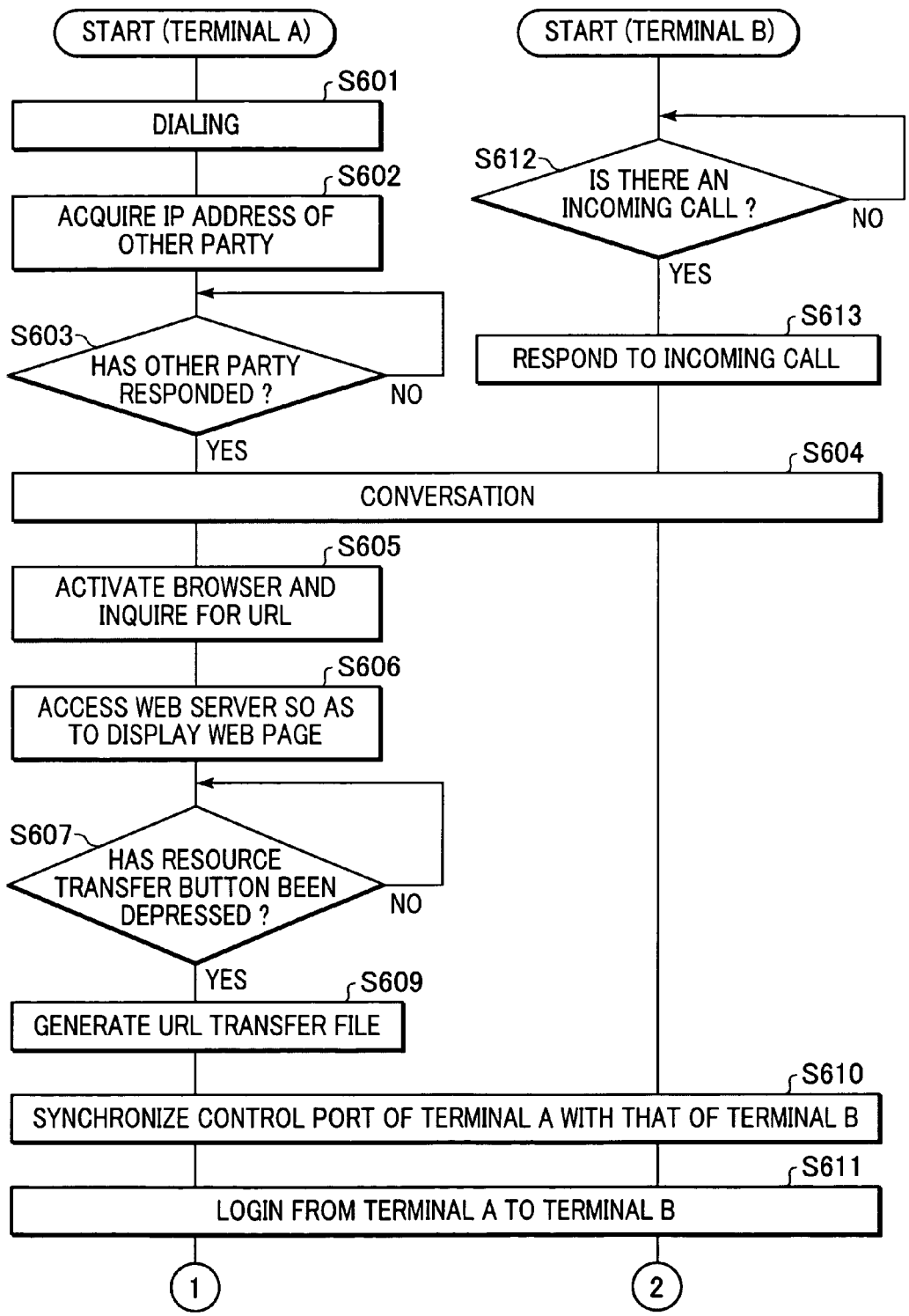
FIG. 10 is a flowchart illustrating the communication control procedures of IP phone communication performed by the terminal shown in FIG. 1.
Figure 11:
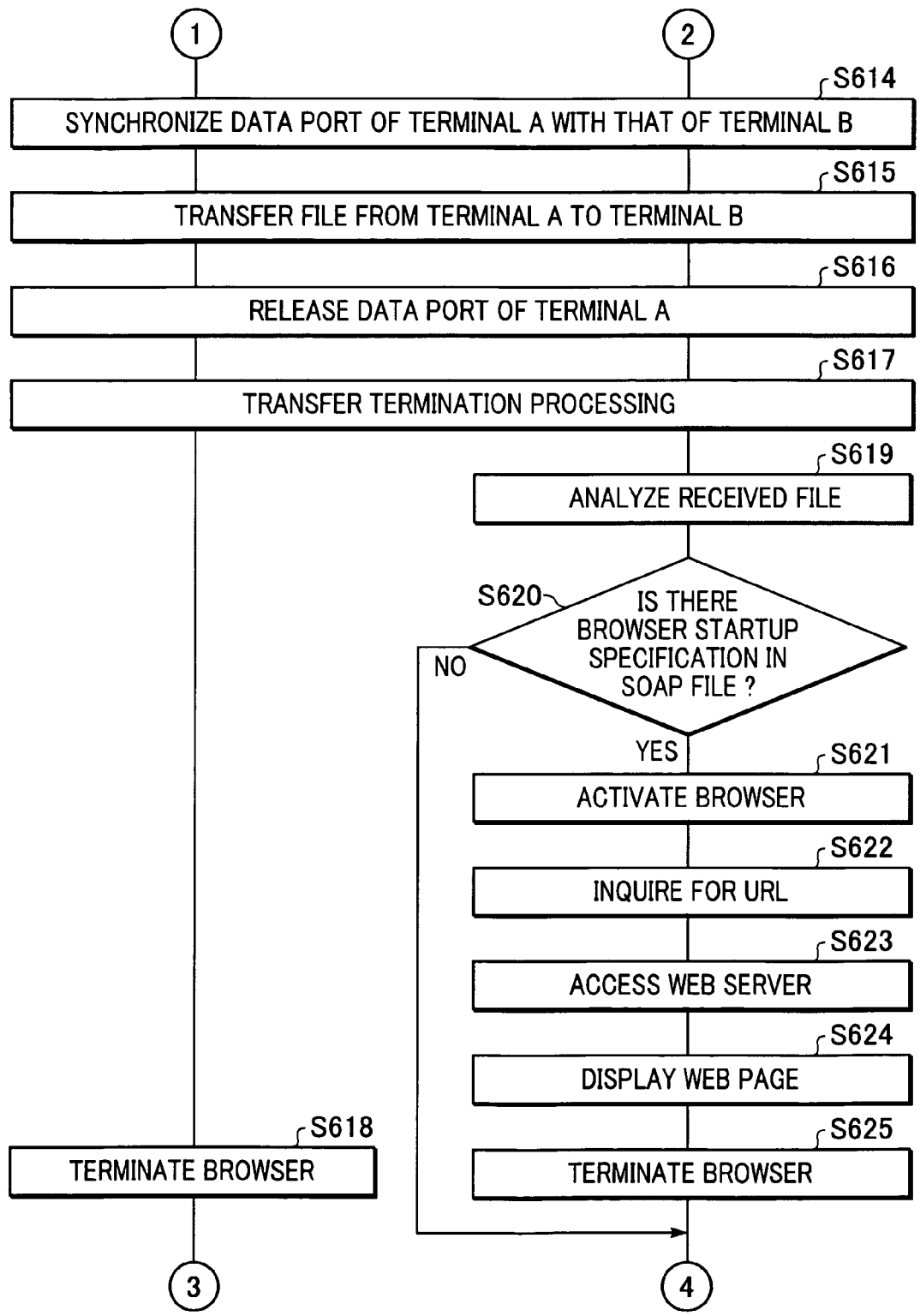
FIG. 11 is a flowchart illustrating the communication control procedures of IP phone communication performed by the terminal shown in FIG. 1.
Figure 12:
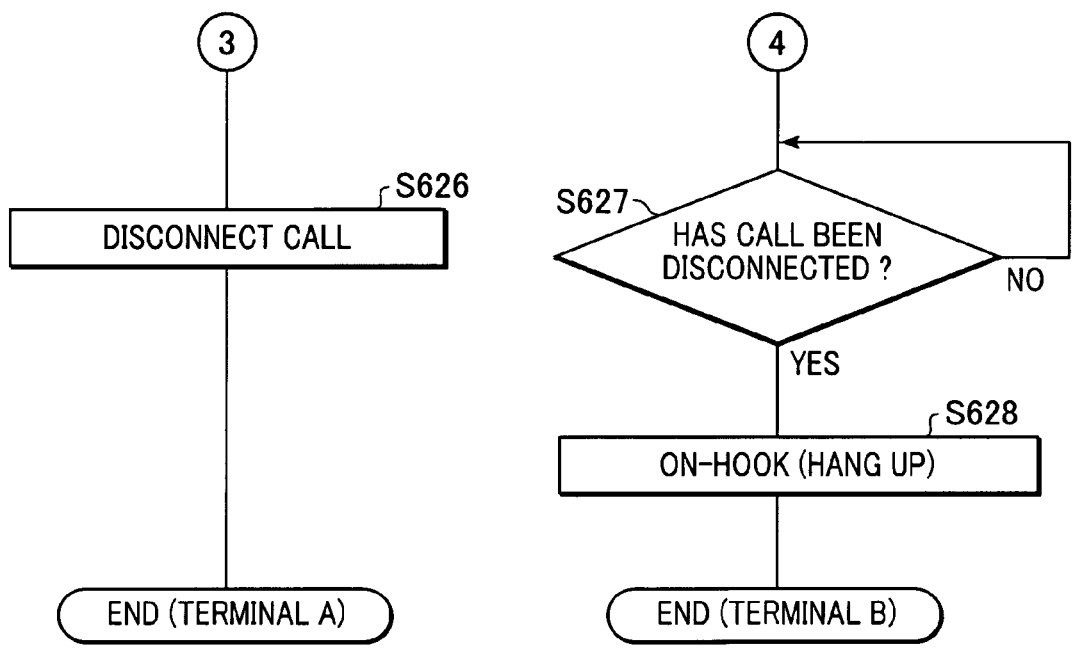
FIG. 12 is a flowchart illustrating the communication control procedures of IP phone communication performed by the terminal shown in FIG. 1.

Next, a general flowchart of the above-described IP phone communication is shown in FIGS. 10 through 12. The procedures in FIGS. 10 through 12 correspond to the above-described communication sequence in FIGS. 5 through 9, in the same way, which are realized by the CPU 201 executing the communication control program. This communication control program of the CPU 201 is stored in a computer-readable medium (i.e., ROM 202) Each step in FIGS. 10 through 12 is denoted by S601 and on.

First, the terminal A which gives notice makes a phone call to the terminal of the other party. Specifically, upon dialing operations being performed at the terminal A, the terminal A connects to the SIP server (S601 in FIG. 10). The SIP server calls up the terminal of the other party, and also returns the IP address corresponding to the phone number of the terminal of the other party to the terminal A (S602). At this time, the terminal A enters a calling state, and awaits response from the terminal of the other party (S603). Upon the terminal of the other party responding to the terminal A, both terminals enter a conversation state (S604).

With the terminal A, upon the browser being activated to display a Web page, and a URL thereof being input to the browser, the terminal A makes an inquiry for the address of the Web server specified by the URL to the DNS server, receives the search results (S605), accesses the Web server based on the IP address obtained from the DNS server so as to acquire the Web page data, and then displays the acquired data (S606).

In order for the terminal of the other party to display the same Web page being displayed on the terminal A, URL transfer operations are performed, i.e., the resource transfer button 244 is pressed at the terminal A. Upon this resource transfer button 244 being pressed (S607), the terminal A generates a file in which the URL is described so as to transfer the URL using FTP (S609). This file is described with SOAP which is an upper protocol of FTP, such that the receiving side can start up the browser.

The terminal A synchronizes its own control port with that of the terminal B of the other party, based on the IP address obtained from the location server (S610). Upon synchronization between both the control ports of the terminals having been established, the terminal A attempts to login to the terminal of the other party (S611).

The terminal A prepares a port for transferring URL data besides the control port, and synchronizes the data transfer port with that of the terminal of the other party (S614 in FIG. 11). The terminal A transmits the file in which the URL is described to the terminal B of the other party via the data transfer port (S615). Upon the URL data transfer being completed, the terminal A releases the URL data transfer port (S616). The terminal A notifies the terminal of the other party of completion of the FTP so as to perform transfer termination processing (S617).

The terminal A which has completed browsing using the browser quits the browser (S618). Upon conversation with the terminal of the other party being completed, the terminal A disconnects voice communication, i.e., hangs up (S626 in FIG. 12).

Next, the flow at the time of receiving the URL of the Web page which the terminal of the other party is displaying, so as to display the same Web page on the own terminal while talking on the IP phone, will be described. The terminal B which will receive a notice monitors whether or not there is an incoming call in a stand-by state (S612). Upon an incoming call being detected, the terminal B responds to the incoming call (S613), and then enters a conversation state (S604).

Upon synchronization being requested from the terminal of the other party, the terminal B synchronizes itself with the terminal of the other party according to the request (S610). Upon login being requested from the terminal of the other party, the terminal B permits the login and enters a stand-by state for data transfer (S611). The terminal B synchronizes itself with the transfer data port of the terminal of the other party (S614), and receives the file in which the URL has been described, from the data transfer port of the terminal of the other party (S615). Upon transfer of the URL data being completed, the terminal B releases the data transfer port of the terminal of the other party (S616), and performs transfer termination processing following receiving notification of completion of the FTP from the terminal of the other party (S617).

The terminal B which has received the file analyzes the received file (S619). In the event that the received file is described in SOAP and includes the URL and the instructions to start up the browser (S620), the terminal B starts up the browser to display the Web page (S621). Upon the URL received from the terminal of the other party being input, the terminal B makes an inquiry regarding the IP address of the Web server specified with the URL to the DNS server, and then receives the search results from the DNS server (S622). The terminal B accesses the Web server based on the IP address obtained from the DNS server so as to receive the data of the Web page (S623), and then displays the Web page with the browser (S624).

Upon finishing browsing, the terminal B quits the browser (S625). At this time, the terminal B monitors the communication state of the terminal of the other party (S627 in FIG. 12), and upon detecting that the terminal of the other party has disconnected, terminates the call (S628).

While the above-described case has illustrated an example wherein the calling terminal A side transmits the URL data to the terminal B side, the transmission of the URL does not depend on which side the calling terminal is, so it is needless to say that the terminal A side can perform browsing following receiving the URL data from the terminal B in the same way as the above-described case. Moreover, in the above example, in the event of the terminal A side transmitting the URL data to the terminal B side, the terminal A side makes FTP login as to the terminal B side, i.e., the terminal B side serves as a FTP server, and the terminal A transmits the URL data (S536 in FIG. 7, using FTP commands such as STOR, STOU, etc.). However, the login direction of the FTP and the transmission/reception direction (whether to use transmission commands such as STOR or STOU, whether to use the reception command RETR, and so forth) are optional at the time of transmitting the URL data, and accordingly these can be changed as necessary.

As described above, the same Internet resource can be browsed between the communication terminals 200 and 220 (A and B) using the Web browser. In particular, with present embodiment, in the event that when one terminal user is browsing a certain Internet resource, and the terminal user wants to show the other party the same resource, simply performing a simple operation, i.e., simply pressing the resource transfer button 244, allows the other party to browse the same Internet resource.

Now, with the present embodiment, techniques for using the one-touch keys 245 on the operating unit 215 will be described as well. Described here are an arrangement wherein the URL information of an Internet resource is registered to one of the one-touch keys 245, thereby enabling the one-touch key 245 to be used as a so-called hot-key, and another arrangement wherein the primary identification information (phone number, host address, host name, and so forth) of the other party and also the URL information of the Internet resource which the terminal user wants to show the other party are registered to one of the one-touch keys 245, and wherein immediately following making a phone call, the URL information is transferred to the other party so as to be displayed by the browser of the other party.

Figure 13:
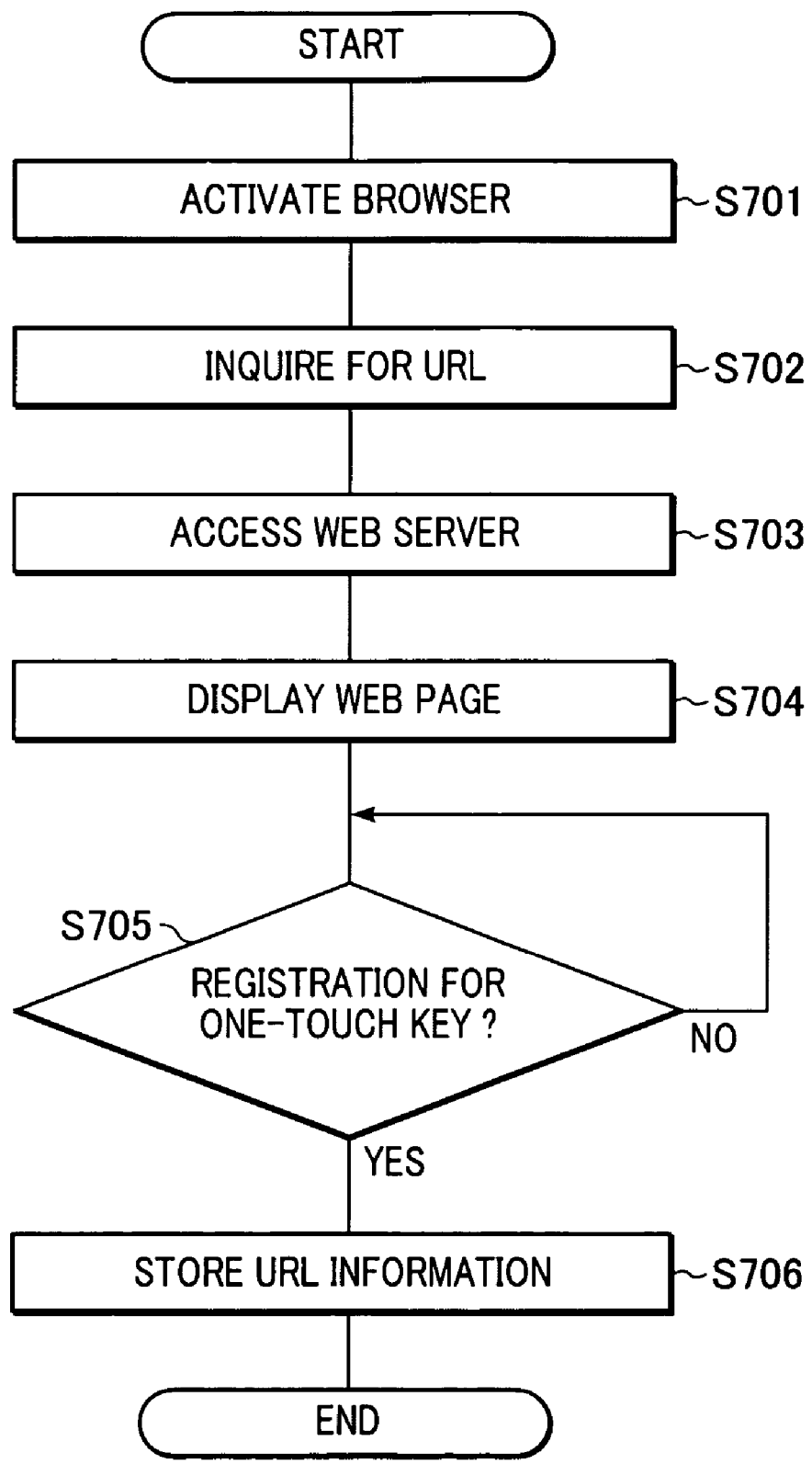
FIG. 13 is a flowchart illustrating the communication control procedures of IP phone communication performed by the terminal shown in FIG. 1.

While one-touch keys such as the one-touch keys 245 have been conventionally used for simply selecting (calling) the other party station, the URL of an Internet resource can be registered to the one-touch keys 245 by performing registration processing as shown in FIG. 13.

FIG. 13 illustrates the procedures executed by the CPU 201 at the time of registering the URL of a Web page being browsed by the terminal user to a one-touch key 245. While a case wherein the user operations and registration processing on the terminal A will be described here, the user operations and registration processing shown in the drawing can be executed with any terminal.

The browser is activated at an arbitrary timing (not restricted to during a call) to display a Web page on the terminal A, the URL of the Web page is entered on the browser of the terminal A (S701), the terminal A makes an inquiry regarding the IP address of the Web server specified with the URL to the DNS server, receives search results from the DNS server (S702), accesses the Web server based on the IP address obtained from the DNS server (S703), acquires the Web page data, and then displays the Web page with the browser (S704). Upon the terminal user performing the registration operations for one-touch keys in a state wherein the Web page is displayed on the browser (S705), the URL information being currently browsed is stored in the registration region corresponding to the specified one-touch key (for example, the above-described address book 203a or a similar memory region) (S706).

FIG. 17 illustrates the configuration of one-touch key registration regions 1700 held in the above-described address book 203a or a similar memory region. With the one-touch key registration regions 1700 in FIG. 17, one record is held for each key 01, 02, and so forth, making up the one-touch key group. Each record comprises a key number 1701 corresponding to a key (not indispensable for configurations using the address positions in memory), a phone number (or IP address or host name, in some cases of IP calls and so forth) 1702 serving as the selection information of the other party, other party name 1703, further an extension space 1704 for storing various types of information, and so forth.

With the one-touch key registration processing (S706 in FIG. 13), URL information such as "http://xxx.xxx.com/ . . . " should be stored in a selection information region in which phone number of the other party is stored, with standard one-touch key registration. With the example of the record 1705 (key number 02) shown in FIG. 17, URL information is directly stored in the phone number region 1702. Or, an arrangement may be made wherein invalid information in an appropriate format is stored in the phone number region 1702, following which URL information is stored in the extension space 1704. Furthermore, another arrangement may be made wherein URL information is stored as shown in the record 1706 (key number 03) in FIG. 17, which will be described later.

Subsequently, when the corresponding one-touch key 245 is pressed, a character string in the URL (or URI) format such as "http:// . . . " is searched from the corresponding region of the one-touch key registration processing information, and in the event that such a character string has been detected, the terminal activates the browser instead of making a phone call to the other party, so as to display the Internet resource corresponding to the URL.

Registering the URL to a specific one-touch key with the above-described configuration allows the one-touch key to be used as a so-called hot-key, thereby enabling the Internet resource corresponding to the URL to be displayed in accordance with a one-touch key operation. This one-touch key is configured of a hardware key, so that the operation thereof is extremely simple and easily learned as compared with application operations such as with the browser. Originally, one-touch keys have been provided to select a specific other party, and accordingly, they provide a terminal user with intuitive operations even in the event of registering such URL information.

Note that registration processing itself to one-touch keys is optional, so known registration methods may be employed. For example, an arrangement may be made wherein a menu or dialog window is displayed on the display unit 214 (it is needless to say that an arrangement may be made wherein the Web browser itself is used for display of the menu and dialog window), and then the corresponding URL information is input in a predetermined input field by the terminal user. With regard to the timing to start the registration processing itself, the menu of the Web browser itself or a hot-key can be used, or a key (button) configured of specific hardware to start the registration processing itself may be provided on the operating unit.

A further progressive arrangement of the above-described configuration may be made wherein combination of specific other party station information and the URL information of the desired Internet resource to be shown to the other party can be registered to a one-touch key 245. Enabling such registration means that the URL information is also transmitted to the other party at the time of making a phone call, and the Internet resource corresponding to the URL information can be shown to the other party immediately following the call connection.

In this case, both the selection information (phone number) of the other party station and the URL needs to be stored, so that the phone number (or IP address or host name or the like) of the other party station is stored in the phone number field 1702, and the URL information of the desired Internet resource is stored in the extension space 1704, as shown in of the record 1706 (key number 03) in FIG. 17, for example.

While whether to store the URL as shown in the above-described record 1705 (key number 02), or whether to store the URL as shown in this record 1706 (key number 03), depends on the configuration of the user interface for making registration operations to the one-touch key, an arrangement may be made for example, wherein in the event that a phone number has already been registered to the key to be registered (for example, key number 01 in FIG. 17), the URL is stored correlated with the other party station as shown in the record 1706 (key number 03), on the other hand, in the event that the phone number has not been registered yet, or a predetermined explicit invalid registration operation has been performed in the phone number field, the URL is stored as shown in the record 1705 (key number 02).

Figure 14:
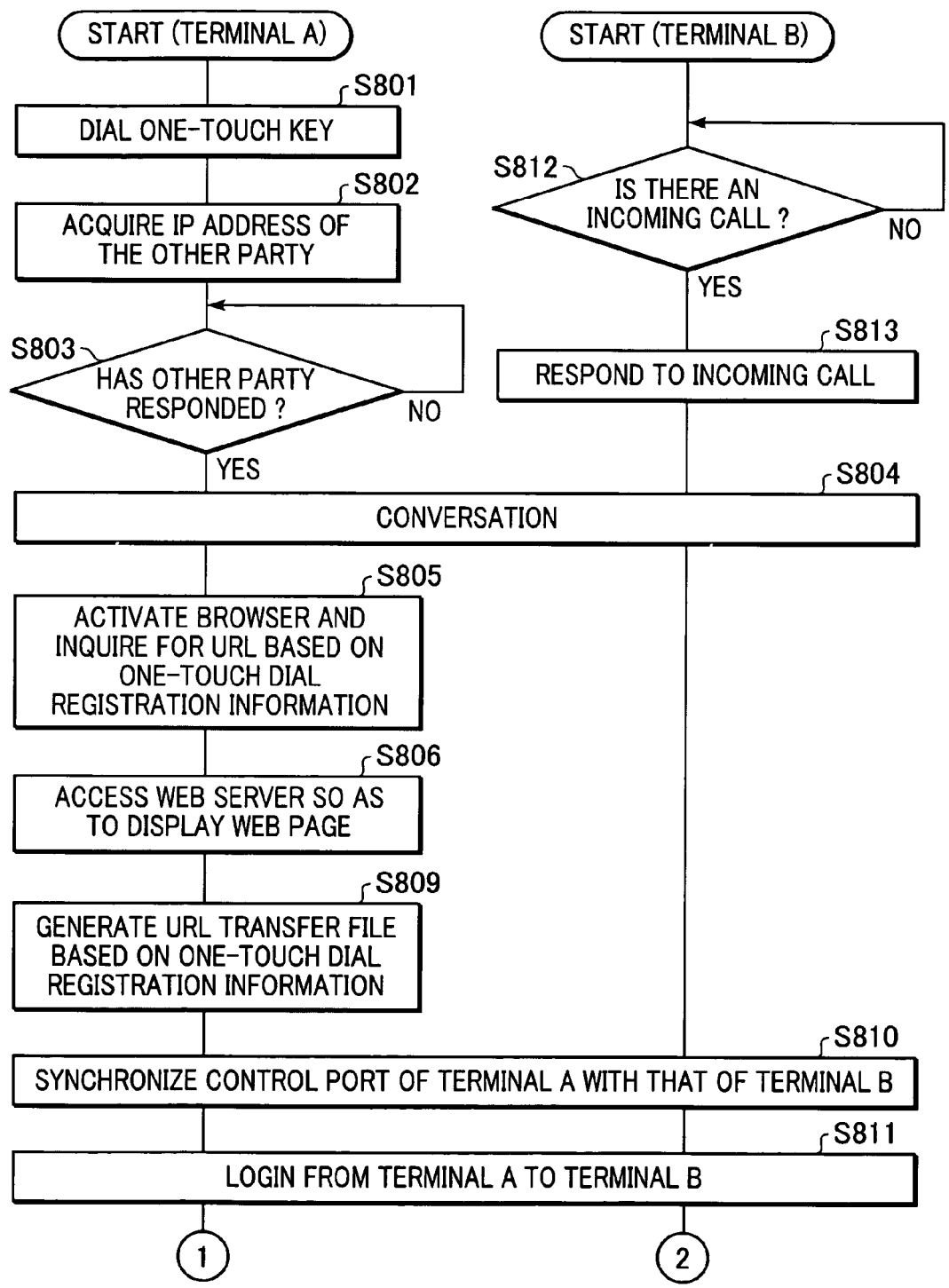
FIG. 14 is a flowchart illustrating the communication control procedures of IP phone communication performed by the terminal shown in FIG. 1.
Figure 15:
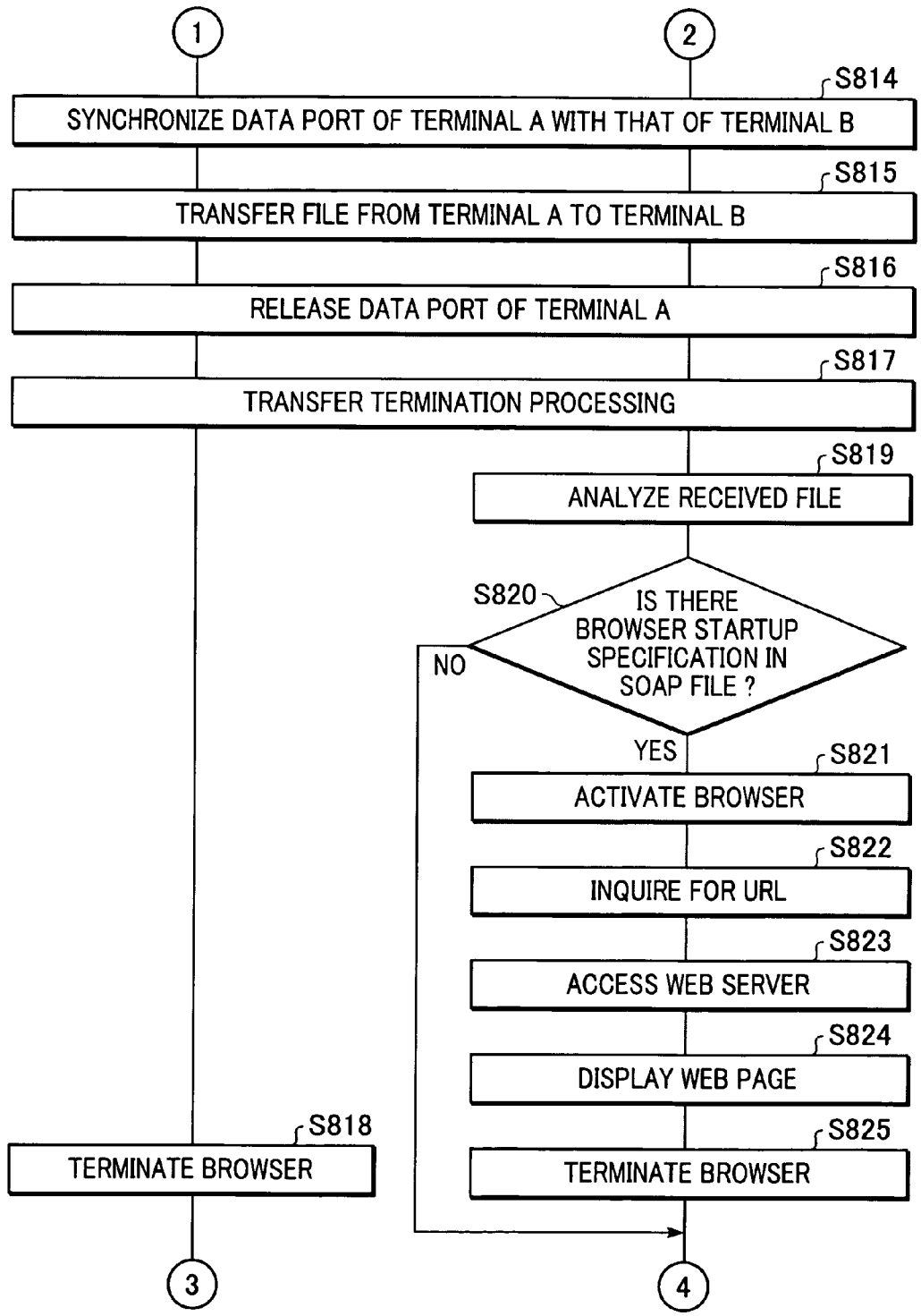
FIG. 15 is a flowchart illustrating the communication control procedures of IP phone communication performed by the terminal shown in FIG. 1.
Figure 16:
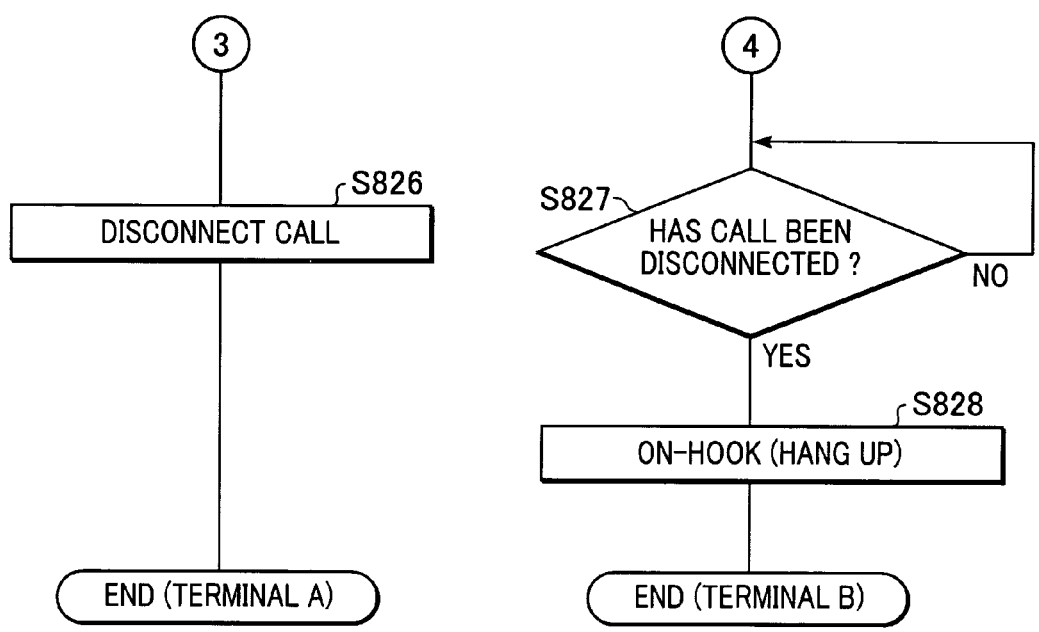
FIG. 16 is a flowchart illustrating the communication control procedures of IP phone communication performed by the terminal shown in FIG. 1.

As described above, registering combination of specific other party station information and the URL information of the desired Internet resource to be shown to the other party on the one-touch key, as shown in FIGS. 14 through 16, enables the URL information to be sent to the terminal of the other party immediately following making a phone call, thereby enabling the terminal of the other party to display the corresponding Internet resource, and also enabling the own terminal to display the same Internet resource.

The format of FIGS. 14 through 16 is similar to that of FIGS. 10 through 12, and steps S601 through S628 in FIGS. 10 through 12 are represented as steps S801 through S828 in FIGS. 14 through 16. With the following description, only the steps which are different between FIGS. 14 through 16 and FIGS. 10 through 12 will be described, and the other steps will be omitted (see the description of FIGS. 10 through 12).

First, FIGS. 14 through 16 are different from FIGS. 10 through 12 in that the one-touch key 245 is used for calling the other party station in step S801. Let us assume that the phone number (or IP address or host name) of the other party station to be called and the URL information to be shown to the other party are stored with correlation to the one-touch key 245, such as shown in recording 1706 (key No. 3) in FIG. 17.

Upon the terminal making the transition to a conversation state in step S804 by the calling operations, the terminal activates its own browser based on the one-touch key registration information in step S805, and makes an inquiry regarding the URL address included in the one-touch key registration information to the DNS server, so as to download and display the Web data (S806). Subsequently, without the terminal user operating the resource transfer button 244, the terminal proceeds to step S809 so as to enter transfer processing wherein the same URL information is transferred to the terminal of the other party based on the one-touch key registration information. The processing following generation of the URL information in step S809 is the same as the processing following step S609 in FIG. 10, so detailed description thereof is omitted here.

As described above, with a configuration wherein a combination of specific other party station information and the URL information of the desired Internet resource to be shown to the other party is registered to the one-touch key, the URL information can be sent to the other party at the time of making a phone call, and the other party can browse the Internet resource corresponding to the URL information immediately following the call connection.

Note that while the techniques for using the one-touch keys 245 in FIG. 1 have been described as simple dialing means, simple dialing means also include means using quick-dial operations (with a numeric keypad, etc.) besides the one-touch keys 245. It is needless to say that registration techniques of the URL information shown with the one-touch keys 245 in FIG. 1 can be applied without any change to the simple dialing means using the quick operations of the numeric keypad, and so forth. For example, with regard to the memory configuration in FIG. 17, storing each quick operation of the specific numeric keypad to each record in FIG. 17 provided for each one-touch key easily accommodates the simple dialing means using quick operations with the numeric keypad.

As can be understood from the above description, according to the present invention, with a communication terminal connected to an IP network for making a phone call using a predetermined IP phone method, and also having browsing means for browsing Internet resources, a control method thereof, and a control program thereof, a configuration wherein the browser means of the communication terminal of the other party can browse desired Internet resources while talking on an IP phone according to operations of specific operating means is employed, thereby providing an excellent advantage wherein both the calling and receiving parties can browse the same Internet resource in a sure manner using simple operations without repeating complicated manual operations.

In particular, according to a configuration wherein, upon the above-described operations being performed while browsing an Internet resource using own browsing means, the terminal transfers the URL information of the Internet resource to the terminal of the other party with which an IP phone call has been established so as to allow the browsing means of the terminal of the other party to browse the Internet resource, the other party can browse the same Internet resource being browsed by the own terminal with extremely simple operations.

Furthermore, according to a configuration wherein the selection information of the terminal of the other party and the URL information of an Internet resource which can be browsed by the above-described browsing means are registered to simple dialing means for selecting the terminal of the other party to be called using an IP phone, the terminal makes a phone call to the terminal of the other party registered to the simple dialing means in response to the operations of the above-described simple dialing means, and further transfers the URL information registered to the simple dialing means to the terminal of the other party so as to allow the browsing means of the terminal of the other party to browse the Internet resource, the URL information registered to the simple dialing means is transferred to the terminal of the other party at the time of making a call using the simple dialing means, and the other party can browse the Internet resource corresponding to the URL information immediately following the call connection.

Also, a configuration wherein only the URL information of an Internet resource which can be browsed by the above-described browsing means is registered to the above-described simple dialing means, is advantageous in that the above-described simple dialing means originally employed for making a call can be employed as so-called hot-keys, thereby reaching the desired Internet resource with extremely simple and intuitive operations so as to browse the content thereof.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A first communication terminal connected to an IP network for making a phone call using an IP phone method using art a SIP protocol, and also having first browsing means for browsing Internet resources, the first communication terminal comprising:

receiving means for receiving an IP address of a second communication terminal from a SIP server when communication starts;

operating means for allowing second browsing means of the second communication terminal, with which IP phone conversation has been established, to browse an Internet resource of the first communication terminal by pressing a button at the first communication terminal; and a one-touch dial key for storing a phone number of a communication terminal of another party and the desired Internet resource, wherein operating the operating means while browsing a certain Internet resource using the first browsing means makes automatically FTP login directly to the second communication terminal with which IP phone conversation has been established, and transfers an URL information of the Internet resource which is being browsed to the second communication terminal by using an FTP order so as to allow the second browsing means to browse the Internet resource, based on the IP address, and wherein the communication terminal has the browser means of the own terminal display the desired Internet resource stored by the one-touch dial key and makes FTP loqin to the communication terminal of another party with which IP phone conversation has been established, in response to a call having been made to a phone number of a communication terminal of another party where the desired Internet resource is stored by the one-touch dial key, transmits the URL information of the desired Internet resource stored by the one-touch dial key to the communication terminal of another party by using an FTP order, and makes the browser means of the communication terminal of another party browse the desired Internet resource.

2. A control method of a first communication terminal connected to an IP network for making a phone call using an IP phone method using a SIP protocol, and also having first browsing means for browsing Internet resources, comprising:

receiving an IP address of a second communication terminal from a SIP server when communication starts;

making automatically FTP login directly to the second communication terminal, with which IP phone conversation has been established;

transmitting URL information of Internet resources which is being browsed to the second communication terminal by using an FTP order;

pressing a button at the first communication terminal to allow browsing the Internet resources by second browsing means of the second communication terminal, in response to specific operating means operations, based on the IP address; and storing, via a one-touch dial key, a phone number of a communication terminal of another party and the desired Internet resource, wherein the communication terminal has the browser means of the own terminal display the desired Internet resource stored by the one-touch dial key and makes FTP login to the communication terminal of another party with which IP phone conversation has been established, in response to a call having been made to a phone number of a communication terminal of another party where the desired Internet resource is stored by the one-touch dial key, transmits the URL information of the desired Internet resource stored by the one-touch dial key to the communication terminal of another party by using an FTP order, and makes the browser means of the communication terminal of another party browse the desired Internet resource.

3. A non-transitory computer-readable medium (ROM) having stored thereon a control program comprising program code having computer-executable instructions for causing a central processing unit to execute the control method according to claim 2.

* * * * *